(12) United States Patent
Jägemar et al.

(10) Patent No.: US 11,216,301 B2
(45) Date of Patent: Jan. 4, 2022

(54) PROCESS SCHEDULING IN A PROCESSING SYSTEM HAVING AT LEAST ONE PROCESSOR AND SHARED HARDWARE RESOURCES

(71) Applicant: Telefonaktiebolaget LM Ericsson (publ), Stockholm (SE)

(72) Inventors: Marcus Jägemar, Sigtuna (SE); Sigrid Eldh, Älvsjö (SE); Andreas Ermedahl, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 606 days.

(21) Appl. No.: 16/090,079

(22) PCT Filed: Apr. 12, 2016

(86) PCT No.: PCT/SE2016/050317
§ 371 (c)(1),
(2) Date: Sep. 28, 2018

(87) PCT Pub. No.: WO2017/180032
PCT Pub. Date: Oct. 19, 2017

(65) Prior Publication Data
US 2020/0334075 A1    Oct. 22, 2020

(51) Int. Cl.
*G06F 9/46*     (2006.01)
*G06F 9/50*     (2006.01)
(Continued)

(52) U.S. Cl.
CPC .......... *G06F 9/4881* (2013.01); *G06F 9/3804* (2013.01); *G06F 9/3867* (2013.01);
(Continued)

(58) Field of Classification Search
CPC .... G06F 9/4881; G06F 9/3804; G06F 9/3867; G06F 9/3887; G06F 9/3889;
(Continued)

(56) References Cited

U.S. PATENT DOCUMENTS 4,574,350 A  *  3/1986  Starr ........................ G06F 9/52
                                                    710/200
5,937,187 A  *  8/1999  Kosche .................... G06F 9/52
                                                    718/104

(Continued)

OTHER PUBLICATIONS

International Search Report and Written Opinion for Application No. PCT/SE2016/050317, dated Dec. 8, 2016, 12 pages.

(Continued)

*Primary Examiner* — Daniel H Pan
(74) *Attorney, Agent, or Firm* — Ndwe LLP

(57) ABSTRACT

A method for enabling scheduling of processes in a processing system having at least one processor and associated hardware resources, at least one of the hardware resources being shared by at least two of the processes. The method is characterized by controlling execution of a process based on a usage bound of the number of allowable accesses, by the process, to a shared hardware resource by halting execution of the process when the number of allowable accesses has been reached, and enabling idle mode or start of execution of a next process. In this way, costly hardware overprovisioning and/or the need for shutting down processor cores can be avoided. By controlling execution of a process based on a usage bound of the number of allowable accesses to a shared hardware resource, instead of simply dividing CPU time between processes, highly efficient shared-resource-based process scheduling can be achieved.

19 Claims, 13 Drawing Sheets

(51) Int. Cl.
| | |
|---|---|
| *G06F 11/34* | (2006.01) |
| *G06F 12/02* | (2006.01) |
| *G06F 9/48* | (2006.01) |
| *G06F 9/38* | (2018.01) |
| *G06F 9/455* | (2018.01) |
| *G06F 12/1027* | (2016.01) |

(52) U.S. Cl.
CPC .......... *G06F 9/3887* (2013.01); *G06F 9/3889* (2013.01); *G06F 9/45558* (2013.01); *G06F 9/4812* (2013.01); *G06F 11/3409* (2013.01); *G06F 12/1027* (2013.01); *G06F 9/5022* (2013.01); *G06F 2009/45583* (2013.01); *G06F 2009/45591* (2013.01)

(58) Field of Classification Search
CPC .... G06F 9/45558; G06F 9/4812; G06F 9/468; G06F 9/5022; G06F 11/3409; G06F 12/1027; G06F 2009/45591; G06F 2009/45583; G06F 13/1663
USPC .......... 718/102–108; 712/220, 225; 710/309; 711/150–152
See application file for complete search history.

(56) References Cited

U.S. PATENT DOCUMENTS

| | | | | |
|---|---|---|---|---|
| 2004/0059879 | A1* | 3/2004 | Rogers | ................ G06F 12/0811 711/154 |
| 2005/0045711 | A1* | 3/2005 | Satake | ............... H04N 1/32496 235/375 |
| 2006/0212869 | A1 | 9/2006 | Bril et al. | |
| 2009/0217280 | A1 | 8/2009 | Miller et al. | |
| 2014/0115182 | A1* | 4/2014 | Sabaa | ................. H04L 67/1097 709/232 |
| 2015/0178199 | A1* | 6/2015 | Wang | .................... G06F 12/082 711/122 |

OTHER PUBLICATIONS

R. Inam et al., "The Multi-Resource Server for Predictable Execution on Multi-core Platforms," 2014, pp. 1-11, 2014 IEEE 19th Real-Time and Embedded Technology and Applications Symposium (RTAS).

R. Inam et al., "Combating Unpredictability in Multicores through the Multi-Resource Server," 2014, pp. 1-8, Proceedings of the 2014 IEEE Emerging Technology and Factory Automation (ETFA).

R. Inam et al., "Towards Implementing Multi-resource Server on Multi-core Linux Platform," 2013, pp. 1-4, 2013 IEEE 18th Conference on Emerging Technologies & Factory Automation (ETFA).

International Preliminary Report on Patentability for Application No. PCT/SE2016/050317, dated Oct. 25, 2018, 9 pages.

Communication pursuant to Article 94(3) EPC for EP Application No. 16718524.8, dated Jan. 22, 2020, 9 pages.

Summons to attend oral proceedings pursuant to Rule 115(1) EPC for EP Application No. 16718524.8, dated Jul. 19, 2021, 11 pages.

* cited by examiner

PROCESS SCHEDULING IN A PROCESSING SYSTEM HAVING AT LEAST ONE PROCESSOR AND SHARED HARDWARE RESOURCES

CROSS-REFERENCE TO RELATED APPLICATIONS

This application is a National stage of International Application No. PCT/SE2016/050317, filed Apr. 12, 2016, which is hereby incorporated by reference.

TECHNICAL FIELD

The proposed technology generally relates to a method and arrangement for enabling scheduling of processes in a processing system, and a process scheduler configured to control execution of processes in a processing system, as well as a corresponding computer program and computer-program product, and also an apparatus for enabling process scheduling in a processing system.

BACKGROUND

Currently existing process schedulers generally divide CPU time between the different processes, or jobs, based on so-called CPU quanta, each of which normally has a pre-defined duration of time during which the CPU is allocated for execution of a scheduled process or job.

For example, a round-robin scheduler generally employs time-sharing, giving each process or job a time slot or CPU quantum corresponding to its allowance of CPU time, and interrupting the process or job if it is not completed by then. The process may be resumed next time a time slot is assigned to that process. If the process terminates or changes its state to waiting during its attributed time quantum, the scheduler may select the first process in the ready queue for execution.

Thus process schedulers of today normally use CPU time division as the main mechanism to partition the CPU workload among its scheduled processes. The CPU quanta metric may be adequate for processes belonging to CPU-bound applications but not for so-called Input/Output (I/O) bound applications, such as the type of applications running in communication systems, aircrafts, and other industrial applications. For the I/O-bound applications, memory accesses or accesses to other type of shared hardware resources may cause congestion and performance bottlenecks.

For many types of hard real-time systems it is necessary to guarantee memory bandwidth for the executing applications. If not, a process may miss its stipulated deadline due to memory stalls. Missing deadlines can cause system instability and system downtime.

It is common to co-locate applications such as I/O-bound communication applications on single-core or multi-core CPUs for cost-saving reasons. Good support for memory scheduling is essential for guaranteeing the desired Quality of Service (QoS) of concurrently executing applications. This is especially important when I/O-bound applications are running in a cloud environment, e.g. inside a virtual machine or a container.

Currently, the industry is required to overprovision hardware resources to guarantee a stable and deterministic execution environment. One process should not affect other processes through using shared hardware resources. Unfortunately, resource overprovisioning is difficult and very costly if absolute performance guarantees should be provided for the applications.

For multi-core based systems the CPU quota alone is not an adequate metric to provide performance guarantees. This is because application processes running on one hardware core may, through accesses to shared resources, affect the performance and behavior of application processes running on other cores. This is especially problematic for the type of I/O-bound applications that are commonly found in telecom systems and other large-scale industrial systems.

There are several ways to address this problem; one common solution is to not use, i.e. turn off, adjacent cores if they are likely to interfere over some shared resource. Another option, as mentioned, is to overprovision the hardware, i.e. make sure that the CPU has sufficient capacity performance and the memory system is dimensioned to handle all type of worst-case shared-resource interference scenarios. Both options are costly to realize and are not utilizing the available hardware resources in an efficient way.

Previous academic work [1, 2, 3] has, in addition to CPU time division, experimented with using memory bandwidth as a scheduling metric.

SUMMARY

It is an object to provide a method for enabling scheduling of processes in a processing system.

It is also an object to provide an arrangement configured to enable scheduling of processes in a processing system.

Another object is to provide a process scheduler configured to control execution of processes in a processing system.

Still another object is to provide a computer program for enabling, when executed, scheduling of processes in a processing system.

Yet another object is to provide a corresponding computer-program product.

It is also an object to provide an apparatus for enabling process scheduling in a processing system.

These and other objects are met by embodiments of the proposed technology.

According to a first aspect, there is provided a method for enabling scheduling of processes in a processing system having at least one processor and associated hardware resources, at least one of the hardware resources being shared by at least two of the processes. The method is characterized by controlling execution of a process based on a usage bound of the number of allowable accesses, by the process, to a shared hardware resource by halting execution of the process when the number of allowable accesses has been reached, and enabling idle mode or start of execution of a next process.

In this way, costly hardware overprovisioning and/or the need for shutting down processor cores can be avoided. By controlling execution of a process based on a usage bound of the number of allowable accesses to a shared hardware resource, instead of simply dividing CPU time between processes, highly efficient shared-resource-based process scheduling can be achieved.

According to a second aspect, there is provided an arrangement configured to enable scheduling of processes in a processing system having at least one processor and associated hardware resources, at least one of the hardware resources being shared by at least two of the processes. The arrangement is configured to control execution of a process based on a usage bound of the number of allowable accesses, by the process, to a shared hardware resource by halting execution of the process when the number of allowable accesses has been reached, and enabling idle mode or start of execution of a next process.

According to a third aspect, there is provided a process scheduler configured to control execution of processes in a processing system having at least one processor and associated hardware resources, at least one of the hardware resources being shared by at least two of the processes. The process scheduler is configured to control execution of a process based on a usage bound of the number of allowable accesses, by the process, to a shared hardware resource by halting execution of the process when the number of allowable accesses has been reached, and enabling idle mode or start of execution of a next process.

According to a fourth aspect, there is provided a computer program for enabling, when executed, scheduling of processes in a processing system having at least one processor and associated hardware resources, at least one of the hardware resources being shared by at least two of the processes. The computer program comprises instructions, which when executed by at least one processor, cause the at least one processor to control execution of a process based on a usage bound of the number of allowable accesses, by the process, to a shared hardware resource by halting execution of the process when the number of allowable accesses has been reached, and enabling idle mode or start of execution of a next process.

According to a fifth aspect, there is provided a computer-program product comprising a computer-readable medium having stored thereon a computer program according to the fourth aspect.

According to a sixth aspect, there is provided an apparatus for enabling process scheduling in a processing system having at least one processor and associated hardware resources, at least one of the hardware resources being shared by at least two processes. The apparatus comprises a control module for controlling execution of a process based on a usage bound of the number of allowable accesses, by the process, to a shared hardware resource by halting execution of the process when the number of allowable accesses has been reached. The apparatus also comprises an enabling module for enabling idle mode or start of execution of a next process.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief system overview of a hardware-based processing system having one or more processors and associated hardware resources.

The processors are sometimes referred to as processor cores, or simply cores, and sometimes also referred to as Central Processing Units, CPUs.

The processor(s) may be general purpose processor(s), or special-purpose processor(s), or a hybrid thereof.

A special-purpose processor may use custom processing circuits and a proprietary Operating System, OS, for execution of software to provide one or more of the features or functions disclosed herein.

A general purpose processor may use a common off-the-shelf, COTS, processor and a standard OS, for execution of software configured to provide one or more of the features or functions disclosed herein.

The hardware resources may be part of the processor(s) such as processor pipeline resources and/or execution branch resources, but is often processor-external hardware resources such as cache and/or other memory in connection with the processor(s). A wide variety of non-limiting examples of hardware resources will be given later on.

As used herein, the non-limiting term "process" may refer to a process, job, thread, or any other task suitable for execution in a processing system. Depending on the Operating System, OS, a process may also be made up of multiple jobs, tasks or threads of execution that execute instructions concurrently.

A process scheduler handles processes as the scheduling entity when selecting the execution order among the total set of processes available for execution.

The processes may originate from one or more applications such as those mentioned previously, and the applications in turn may be executed more or less directly on a physical processing system or, alternatively, on one or more Virtual Machines, VMs, using virtualization, as will be explained in more detail later on. In the latter case, the VMs may for example be implemented on a Virtual Server or packed into a so-called Container. An application may include one or more processes together with data and/or configuration information.

Figure 1A:
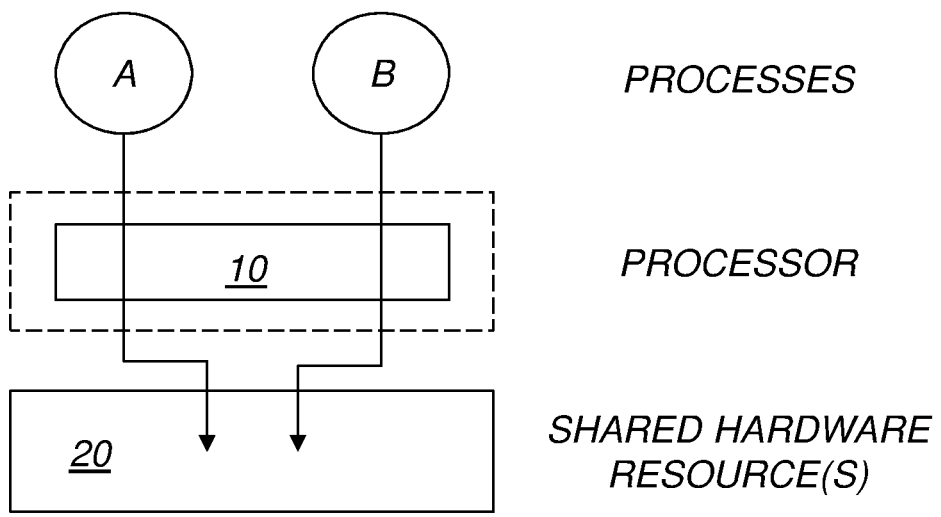
FIG. 1A is a schematic diagram illustrating an example of a processing system in which hardware resources are shared by at least two processes.

FIG. 1A is a schematic diagram illustrating an example of a processing system in which hardware resources are shared by at least two processes. In this particular example, two processes A and B execute on the same processor 10 and share at least part of the associated hardware resources 20.

Figure 1B:
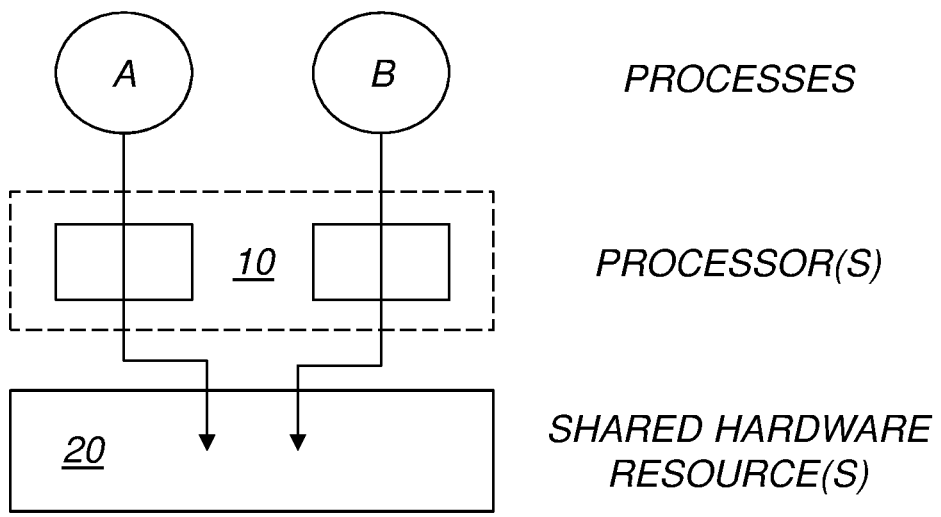
FIG. 1B is a schematic diagram illustrating another example of a processing system in which hardware resources are shared by at least two processes.

FIG. 1B is a schematic diagram illustrating another example of a processing system in which hardware resources are shared by at least two processes. In this particular example, two processes A and B execute on different processors 10, while sharing at least part of the associated hardware resources 20.

Figure 2:
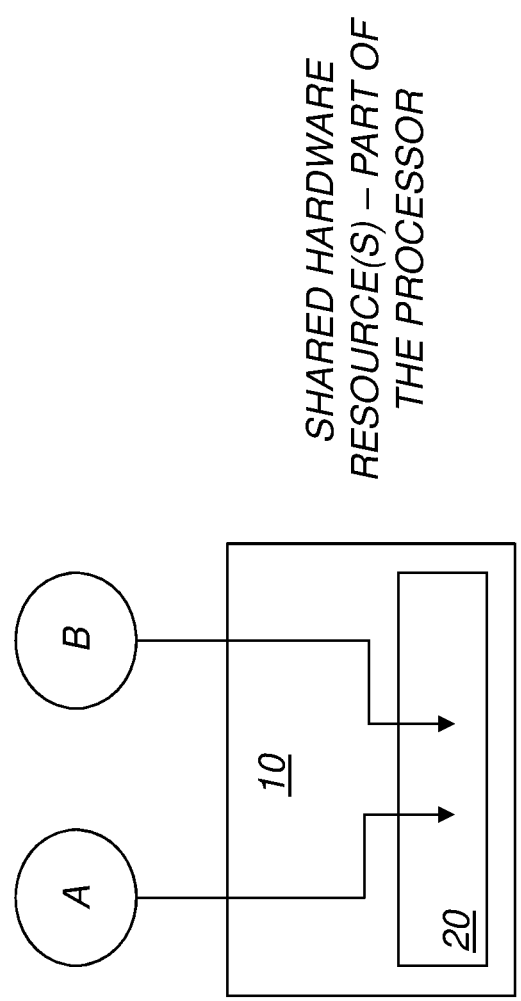
FIG. 2 is a schematic diagram illustrating yet another example of a processing system in which hardware resources are shared by at least two processes, where at least one of the shared hardware resources is part of the processor(s) on which the processes execute.

FIG. 2 is a schematic diagram illustrating yet another example of a processing system in which hardware resources are shared by at least two processes. In this particular example, at least one of the shared hardware resources 20 is part of the processor(s) 10 on which two processes A and B execute.

According to a first aspect, there is provided a method for enabling scheduling of processes in a processing system.

Figure 3:
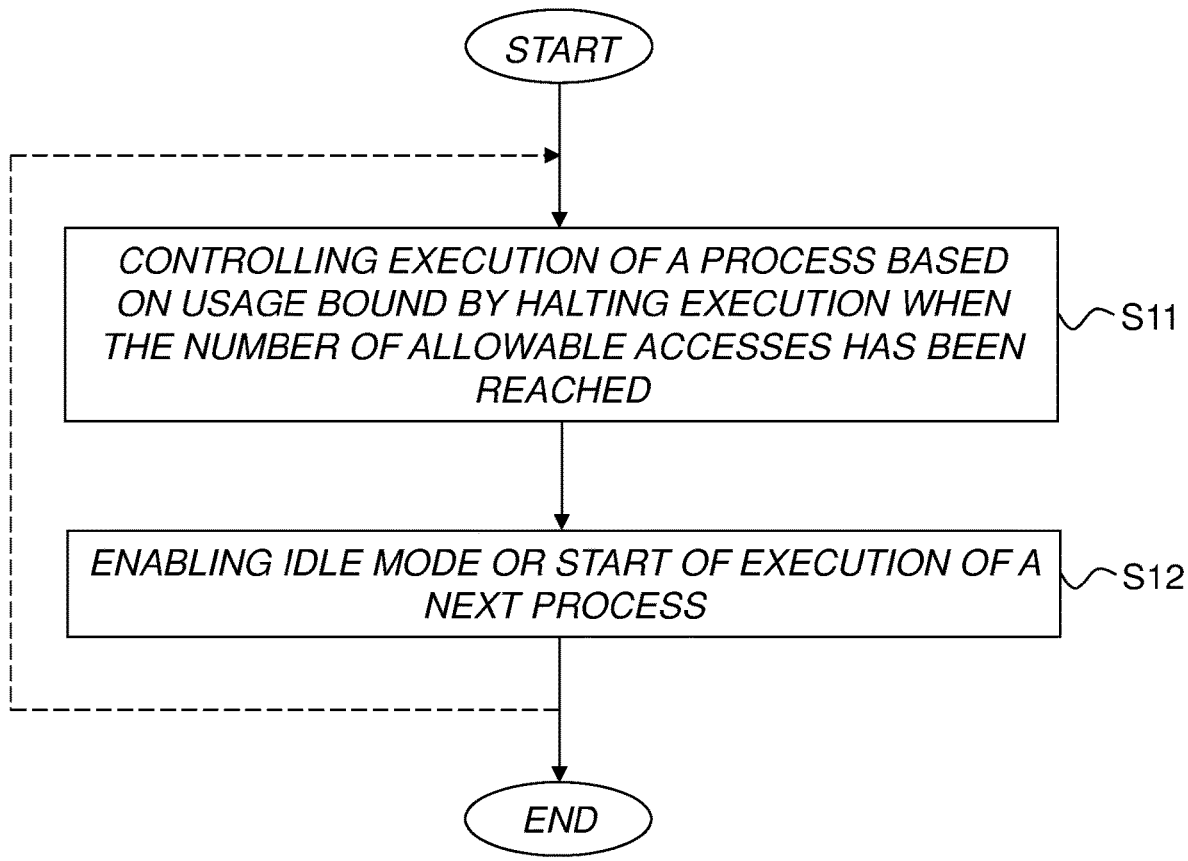
FIG. 3 is a schematic flow diagram illustrating an example of a method for enabling scheduling of processes in a processing system having at least one processor and associated hardware resources.

FIG. 3 is a schematic flow diagram illustrating an example of a method for enabling scheduling of processes in a processing system having at least one processor and associated hardware resources. It is assumed that at least one of the hardware resources is shared by at least two of the processes.

The method is characterized by:

S11: controlling execution of a process based on a usage bound of the number of allowable accesses, by the process, to a shared hardware resource by halting execution of the process when the number of allowable accesses has been reached;

S12: enabling idle mode or start of execution of a next process.

By controlling execution of a process based on a usage bound of the number of allowable accesses to a shared hardware resource, instead of simply dividing CPU time between processes, highly efficient shared-resource-based process scheduling can be achieved. In this way, costly hardware overprovisioning and/or the need for shutting down processor cores can be avoided.

By way of example, the step S11 of controlling execution of a process may be repeated for the next process.

In a particular example, a value, equal to or greater than two, of the usage bound of the number of allowable accesses to the shared hardware resource may be assigned to each relevant process.

For example, the value of the usage bound may be assigned before execution of the process and/or adapted during execution of the process.

More generally, an individual usage bound, with a value equal to or greater than two, may for example be assigned to each of a number of processes for each of a number of shared hardware resources.

Figure 4:
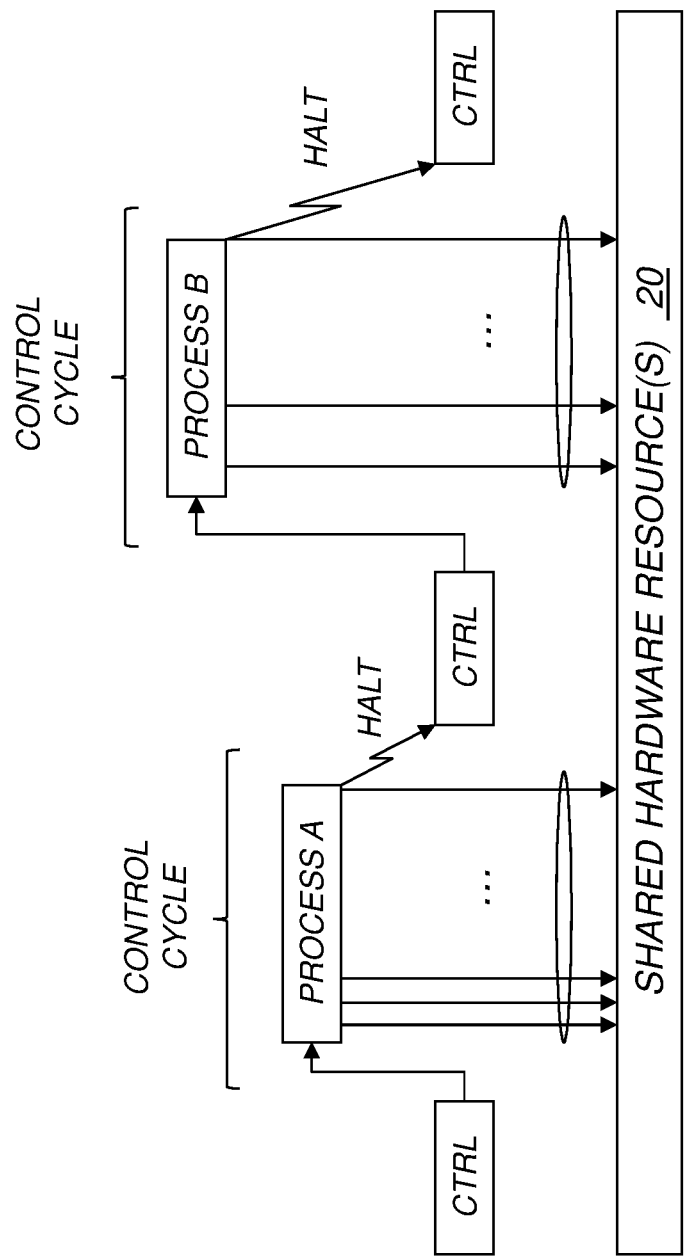
FIG. 4 is a schematic diagram illustrating an example of an arrangement/mechanism for controlling execution of a process based on a usage bound of the number of allowable accesses to a shared hardware resource.

FIG. 4 is a schematic diagram illustrating an example of an arrangement/mechanism for controlling execution of a process based on a usage bound of the number of allowable accesses to a shared hardware resource. In this example, a control mechanism CTRL such as a process scheduler may control execution of a process A based on a usage bound of the number of allowable accesses, by process A, to a shared hardware resource 20 by halting execution of the process when the number of allowable accesses for process A has been reached. The control mechanism CTRL may then enable idle mode or start of execution of a next process B. The control mechanism may further control execution of process B based on a usage bound of the number of allowable accesses, by process B, to the shared hardware resource 20 by halting execution of process B when the number of allowable accesses for process B has been reached, and so forth for any selected number of control cycles for controlling process execution.

Figure 5:
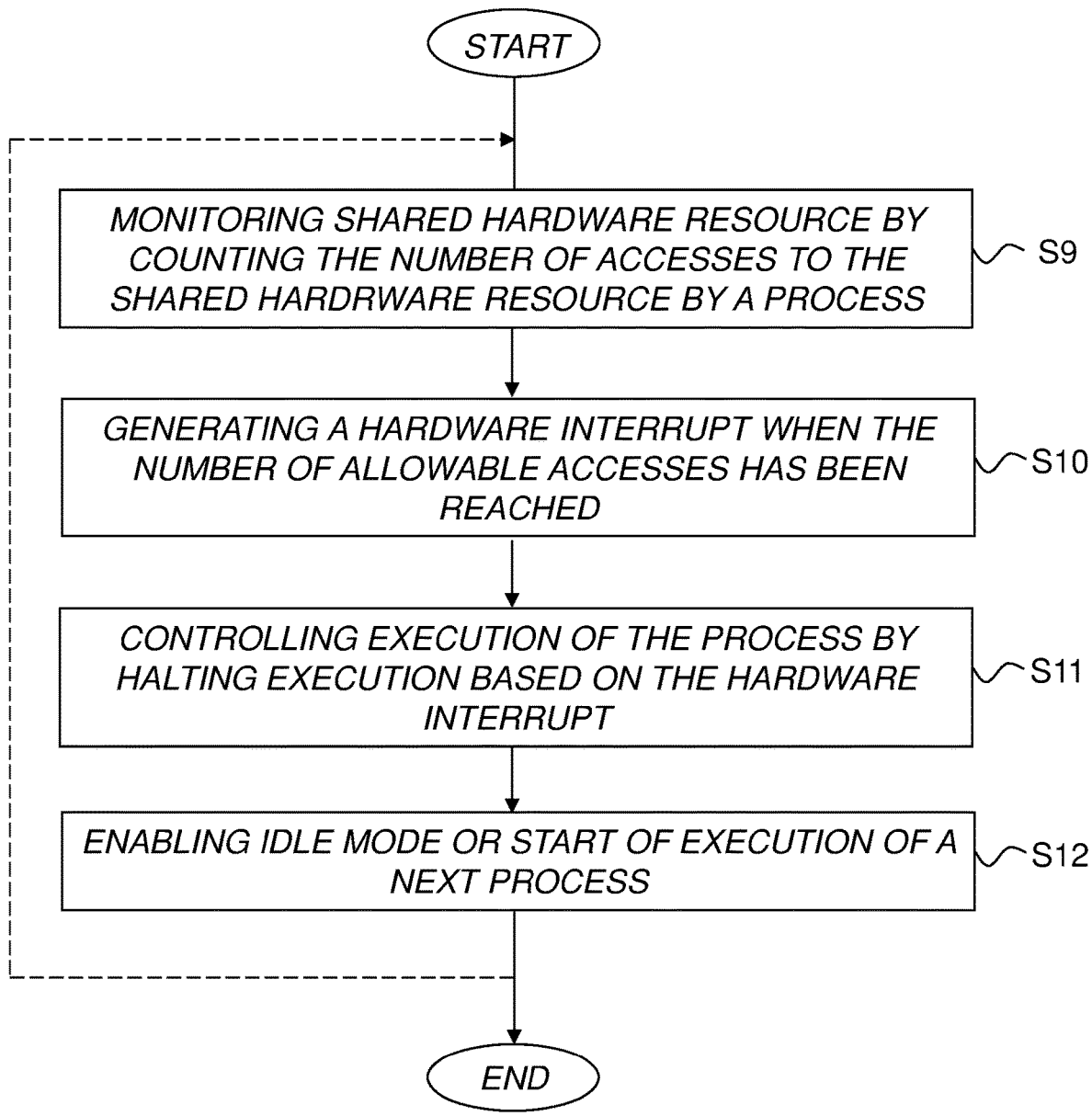
FIG. 5 is a schematic flow diagram illustrating another example of a method for enabling scheduling of processes in a processing system having at least one processor and associated hardware resources

FIG. 5 is a schematic flow diagram illustrating another example of a method for enabling scheduling of processes in a processing system having at least one processor and associated hardware resources. In this particular example, the method comprises:

S9: monitoring the shared hardware resource by counting the number of accesses to the shared hardware resource by the process, S10: generating a hardware interrupt when the number of allowable accesses has been reached, S11: controlling execution of the process by halting execution of the process based on the hardware interrupt, and S12: enabling idle mode or start of execution of a next process.

In a particular example, a so-called hardware performance monitor unit monitors access to the shared hardware resource 20 and increments, for each access, a hardware counter to count the number of accesses to the shared hardware resource by the process, and the hardware counter generates the hardware interrupt when it has reached its maximum value and the next increment causes a counter overflow.

A performance monitor unit may generally be seen as a hardware resource capable of counting hardware events such as memory accesses, cache misses, branch prediction statistics, and so forth.

As an example, a usage bound, $USAGE\_BOUND_{P,R}$, for process P and shared hardware resource R, may be assigned and the value of the hardware counter $PMU_R$ for shared hardware resource R may be set, before scheduling process P for execution, to the following value:

$$PMU_R = MAX\_VAL\_PMU_R - USAGE\_BOUND_{P,R}$$

where $MAX\_VAL\_PMU_R$ is the maximum value of the hardware counter for shared hardware resource R.

The hardware counter $PMU_R$ for shared hardware resource R may then be incremented by one for each access to the shared hardware resource R, and when the hardware counter has reached its maximum value $MAX\_VAL\_PMU_R$, the next increment will cause a counter overflow, which in turn will generate the hardware interrupt.

$USAGE\_BOUND_{P,R}$, for process P and shared hardware resource R is thus a quantifiable bound for process P on the usage of resource R. Such a bound can for example be the maximum number of cache misses or memory access within a given time period. The usage bounds can be determined in any of a number of different ways, e.g. by letting an expert evaluate the considered application, or using more or less simple rules of thumb or determining a usage bound based on hardware profiling information (configuring the PMU for a desired metric) obtained by executing the process(es) on the target hardware (i.e. the processing system). By way of example, what usage bounds to assign to different resources may depend on the characteristics of the target hardware, such as the shared hardware resources and the PMUs available, as well as characteristics of the OS and/or the processes running on the target hardware.

Just to exemplify, assume that the usage bound $USAGE\_BOUND_{A,R}$ for a particular process A and shared hardware resource R is 10 accesses and the maximum value $MAX\_VAL\_PMU_R$ of the counter is 512, then the value $PMU_R$ of the hardware counter for resource X is set to:

$$PMU_R = 512 - 10 = 502$$

For each access, the hardware counter is incremented: 502, 503, 504, . . . , 511, 512 until an overflow interrupt is generated in connection with the maximum value. According to the proposed technology, this interrupt may be used by the process scheduler to halt execution of the ongoing process, and enabling idle mode or start of execution of a next process. As an example, there may be an interrupt service routine, which will halt execution of the currently running process. This provides an opportunity for the OS scheduler to reschedule another process in its run queue.

As previously mentioned, the processes may be originating from one or more applications. By way of example, the application(s) may be running inside Virtual Machines, VM, or containers, as will be explained later on.

By way of example, the shared hardware resource may include at least one of the following examples:
  a memory and/or cache resource;
  a processor pipeline resource;
  an execution branch resource;
  a Translation Lookaside Buffer, TLB, resource;
  a Floating Point, FP, operation/instruction resource;
  a processing interrupt resource;
  a Single Instruction Multiple Data, SIMD, vector instruction resource; and
  a Multiple Instruction Multiple Data, MIMD, vector instruction resource.

For example, the number of allowable accesses to a shared hardware resource may be represented by at least one of the following examples:
  memory and/or cache miss rate/ratio;
  instructions completed;
  pipeline stall rate/ratio;
  pipeline instruction throughput rate/ratio;
  branch miss rate/ratio;
  fetched and/or completed instruction rate/ratio;
  Translation Lookaside Buffer, TLB, miss rate/ratio;
  Floating Point, FP, operation rate/ratio;
  interrupt rate/ratio;
  Single Instruction Multiple Data, SIMD, vector instruction rate/ratio; and
  Multiple Instruction Multiple Data, MIMD, vector instruction rate/ratio.

As previously indicated, the proposed idea is generally applicable to any type of shared hardware resources in a processor-based system, and the examples above are merely illustrative and non-limiting. The proposed mechanism may be particularly useful when the shared hardware resource is a memory/cache resource and the number of allowable accesses is represented by a number of allowable memory/cache accesses. Another important example includes using a PMU counter for completed instructions, e.g. using a bound on the number of completed machine instructions as a representation of the usage bound of the number of allowable accesses to a shared hardware resource.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more general-purpose processors, special-purpose processors, microprocessors, Digital Signal Processors (DSPs), Central Processing Units (CPUs), and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided an arrangement configured to enable scheduling of processes in a processing system having at least one processor and associated hardware resources, at least one of the hardware resources being shared by at least two of the processes. The arrangement is configured to control execution of a process based on a usage bound of the number of allowable accesses, by the process, to a shared hardware resource by halting execution of the process when the number of allowable accesses has been reached, and enabling idle mode or start of execution of a next process.

By way of example, the arrangement may also be configured to control execution of the next process based on a usage bound of the number of allowable accesses to the shared hardware resource, wherein the usage bound is individual for each process.

Further, the arrangement may be configured to enable assignment of a value, equal to or greater than two, of the usage bound of the number of allowable accesses to the shared hardware resource.

For example, the arrangement may be configured to enable assignment of the value of the usage bound before execution of the process and/or to enable adapting the value of the usage bound during execution of the process.

In a particular example, the arrangement is configured to monitor the shared hardware resource to count the number of accesses to the shared hardware resource by the process, and to generate a hardware interrupt when the number of allowable accesses has been reached, and to halt execution of the process in response to the hardware interrupt.

Figure 6:
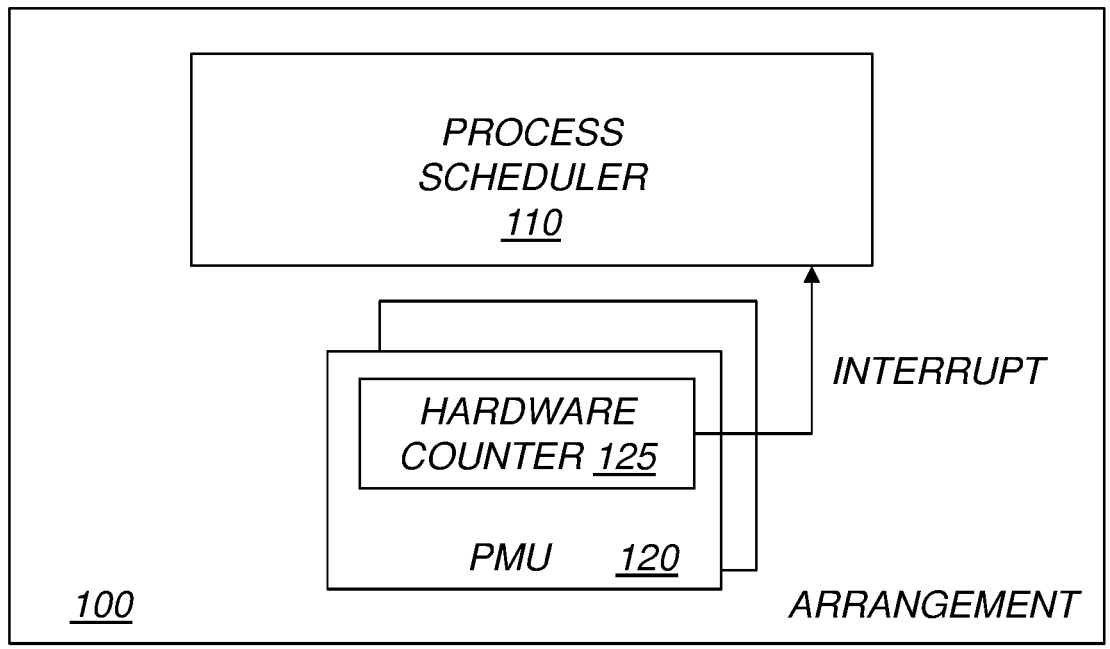
FIG. 6 is a schematic block diagram illustrating a particular example of an arrangement configured to enable scheduling of processes in a processing system.

FIG. 6 is a schematic block diagram illustrating a particular example of an arrangement configured to enable scheduling of processes in a processing system. The arrangement 100 comprises a process scheduler 110 and a number of one or more hardware counters 125, one for each shared hardware resource to count the number of accesses to that shared hardware resource. By way of example, each hardware counter 120 is included as part of a corresponding hardware performance monitor unit, PMU, 120.

Figure 7:
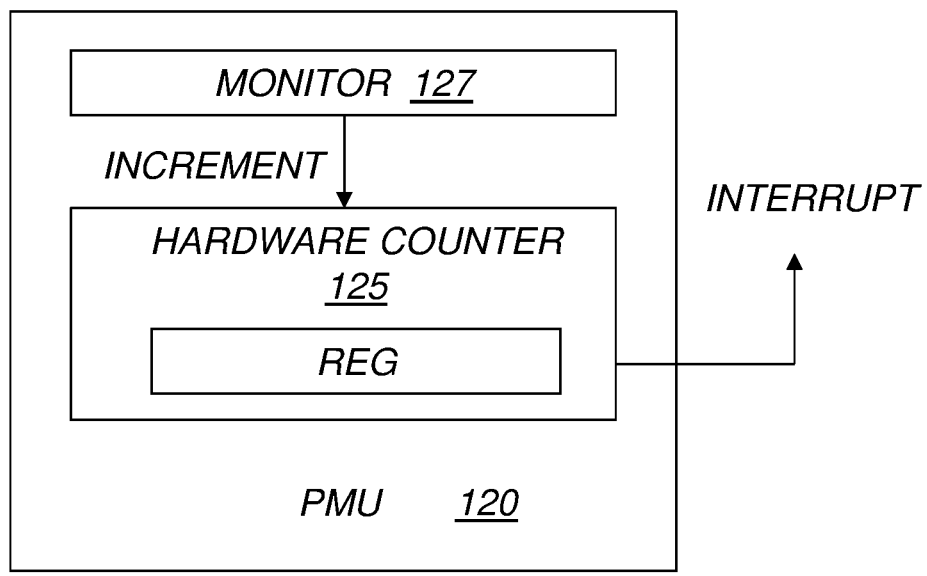
FIG. 7 is a schematic block diagram illustrating a particular example of a performance monitor unit.

FIG. 7 is a schematic block diagram illustrating a particular example of a performance monitor unit. In this particular example, the PMU 120 is configured to monitor 127 access to the shared hardware resource and to increment, for each access, a hardware counter 125 to count the number of accesses to the shared hardware resource by the process, wherein the hardware counter 125 is configured to generate the hardware interrupt when it has reached its maximum value and the next increment causes a counter overflow.

The PMU is also commonly referred to as a hardware performance counter. Such hardware performance counter can be seen as special-purpose registers built into modern microprocessors to store the counts of hardware-related activities within computer systems. They are normally used by advanced users to conduct low-level performance analysis or tuning. However, in the prior art, such hardware performance counters have never been used to halt execution of a process in response to a hardware interrupt generated when a number of allowable accesses has been reached.

In a particular example, the arrangement 100 may be configured to enable assignment, for process P and shared hardware resource R, of the usage bound USAGE_BOUND$_{P,R}$ and to set, before scheduling process P for execution, the value PMU$_R$ of the hardware counter 125 for shared hardware resource R to the following value:

PMU$_R$=MAX_VAL_PMU$_R$−USAGE_BOUND$_{P,R}$, where MAX_VAL_PMU$_R$ is the maximum value of the hardware counter 125 for shared hardware resource R, and
wherein the hardware counter 125, PMU$_R$ for shared hardware resource R is 10 configured to be incremented by one for each access to the shared hardware resource R, and when the hardware counter 125 has reached its maximum value MAX_VAL_PMU$_R$, the next increment will cause a counter overflow, which in turn will generate the hardware interrupt.

As previously indicated, the arrangement may be configured to control execution of processes originating from one or more applications.

For example, the application(s) may even be running inside Virtual Machines, VM, or containers.

By way of example the arrangement may be configured to operate with a shared hardware resource that includes at least one of the following examples:
a memory and/or cache resource;
a processor pipeline resource;
an execution branch resource;
a Translation Lookaside Buffer, TLB, resource;
a Floating Point, FP, operation/instruction resource;
a processing interrupt resource;
a Single Instruction Multiple Data, SIMD, vector instruction resource; and
a Multiple Instruction Multiple Data, MIMD, vector instruction resource.

The arrangement may for example be configured to operate with the number of allowable accesses to a shared hardware resource being represented by at least one of the following examples:
memory and/or cache miss rate/ratio;
instructions completed;
pipeline stall rate/ratio;
pipeline instruction throughput rate/ratio;
branch miss rate/ratio;
fetched and/or completed instruction rate/ratio;
Translation Lookaside Buffer, TLB, miss rate/ratio;
Floating Point, FP, operation rate/ratio;
interrupt rate/ratio;
Single Instruction Multiple Data, SIMD, vector instruction rate/ratio; and
Multiple Instruction Multiple Data, MIMD, vector instruction rate/ratio.

In a non-limiting example, the arrangement may be configured to operate with the shared hardware resource being a memory/cache resource and the number of allowable accesses being represented by a number of allowable memory/cache accesses.

By way of example, the process scheduler 110 may be an Operating System, OS, scheduler. Examples of process schedulers for currently existing Operating Systems include process schedulers for Linux, Windows, Unix, OSE, and so forth. In this context, a process scheduler is an OS module responsible for selecting the next process for execution.

Currently existing process schedulers do not generally consider accesses to shared hardware resources, such as cache or RAM accesses, when scheduling application processes.

According to a third aspect, there is thus provided a process scheduler 110 configured to control execution of processes in a processing system having at least one processor and associated hardware resources, at least one of the hardware resources being shared by at least two of the processes. The process scheduler 110 is configured to control execution of a process based on a usage bound of the number of allowable accesses, by the process, to a shared hardware resource by halting execution of the process when the number of allowable accesses has been reached, and enabling idle mode or start of execution of a next process.

Preferably, the process scheduler 110 may also be configured to control execution of the next process based on a usage bound of the number of allowable accesses to the shared hardware resource 20, wherein the usage bound is individual for each process.

Normally, the process scheduler 110 may be configured to enable assignment of a value, equal to or greater than two, of the usage bound of the number of allowable accesses to the shared hardware resource 20.

For example, the process scheduler 110 may be configured to enable assignment of the value of the usage bound before execution of the process and/or to enable adapting the value of the usage bound during execution of the process.

As previously indicated, the process scheduler 110 may be configured to cooperate with a hardware counter 125 adapted to count the number of accesses to the shared hardware resource 20 by the process and to receive a hardware interrupt from the hardware counter 125 when the number of allowable accesses have been reached to halt execution of the process in response to the hardware interrupt.

Further, the process scheduler 110 may be configured to cooperate with a hardware performance monitor unit 120 adapted to monitor access to the shared hardware resource 20 and to increment the hardware counter 125 for each access.

As described above, the process scheduler 110 may be configured to enable assignment, for process P and shared hardware resource R, of the usage bound USAGE_BOUND$_{P,R}$ and to set, before scheduling process P for execution, the value of the hardware counter 125 for shared hardware resource R to the following value:

$$PMU_R = MAX\_VAL\_PMU_R - USAGE\_BOUND_{P,R},$$

where $MAX\_VAL\_PMU_R$ is the maximum value of the hardware counter 125 for shared hardware resource R, and wherein the hardware counter 125 for shared hardware resource R is configured to be incremented by one for each access to the shared hardware resource R, and when the hardware counter has reached its maximum value, the next increment will cause a counter overflow, which in turn will generate the hardware interrupt.

For example, the process scheduler 110 is an Operating System, OS, scheduler.

Typically, the process scheduler 110 is configured to control execution of processes originating from one or more applications.

As previously mentioned, the application(s) may even are running inside Virtual Machines, VM, or containers.

The process scheduler 110 may be configured to operate with a shared hardware resource 20 that includes at least one of the following examples:
 a memory and/or cache resource;
 a processor pipeline resource;
 an execution branch resource;
 a Translation Lookaside Buffer, TLB, resource;
 a Floating Point, FP, operation/instruction resource;
 a processing interrupt resource;
 a Single Instruction Multiple Data, SIMD, vector instruction resource; and
 a Multiple Instruction Multiple Data, MIMD, vector instruction resource.

The process scheduler 110 may be configured to operate with the number of allowable accesses to a shared hardware resource 20 being represented by at least one of the following examples:
 memory and/or cache miss rate/ratio;
 instructions completed;
 pipeline stall rate/ratio;
 pipeline instruction throughput rate/ratio;
 branch miss rate/ratio;
 fetched and/or completed instruction rate/ratio;
 Translation Lookaside Buffer, TLB, miss rate/ratio;
 Floating Point, FP, operation rate/ratio;
 interrupt rate/ratio;
 Single Instruction Multiple Data, SIMD, vector instruction rate/ratio; and
 Multiple Instruction Multiple Data, MIMD, vector instruction rate/ratio.

In a particular, non-limiting example, the process scheduler 110 is configured to operate with the shared hardware resource 20 being a memory/cache resource and the number of allowable accesses being represented by a number of allowable memory/cache accesses.

As will be described with reference to the example of FIG. 16, the process scheduler 110 may comprise a processor 210 and a memory 220, the memory 220 comprising instructions executable by the processor, whereby the processor is operative to control execution of processes, as described herein.

It is also possible to provide a solution based on a combination of hardware and software. The actual hardware-software partitioning can be decided by a system designer based on a number of factors including processing speed, cost of implementation and other requirements.

Figure 8:
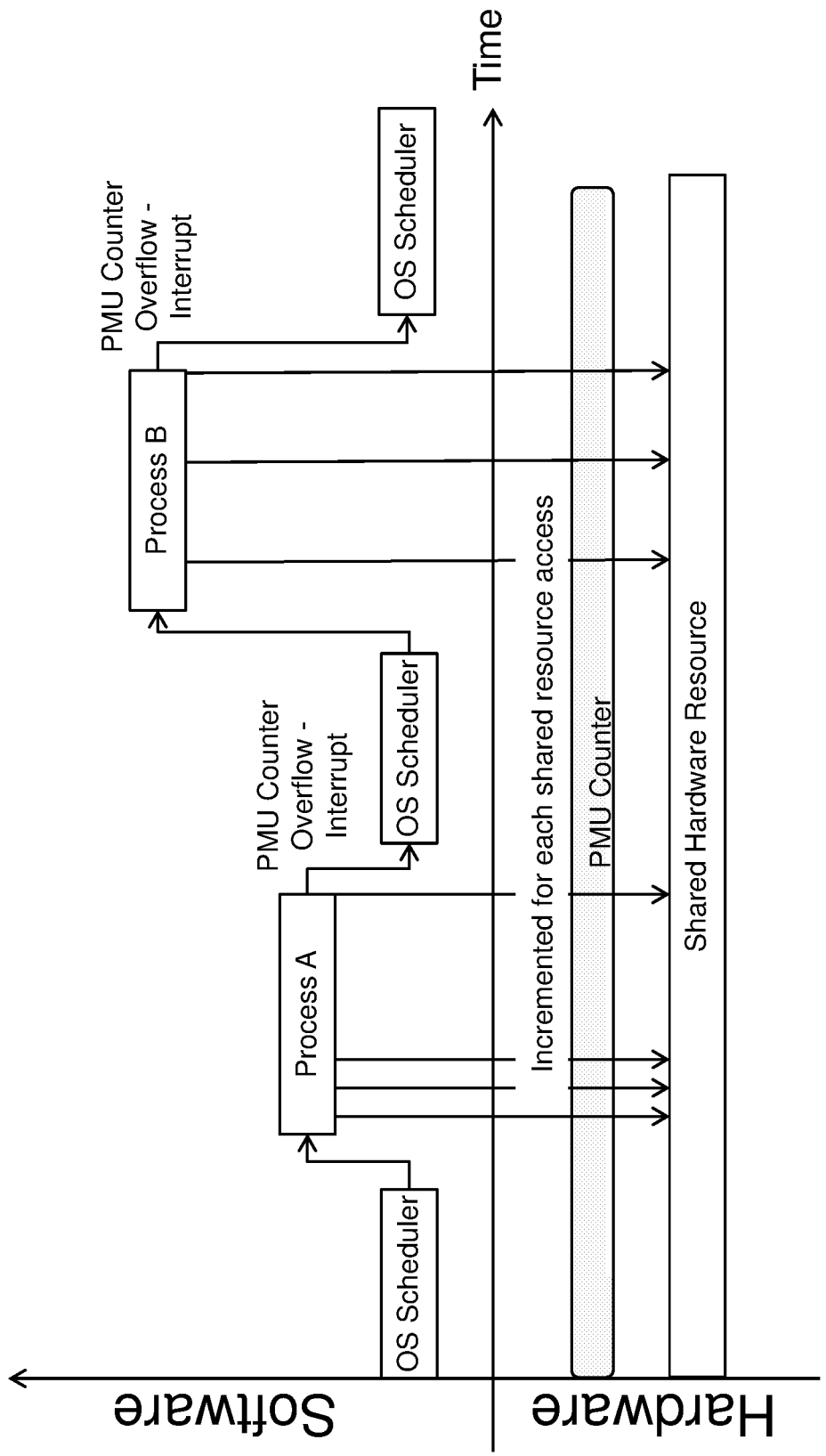
FIG. 8 is a schematic diagram illustrating a particular example of an arrangement/mechanism for controlling execution of a process based on a usage bound of the number of allowable accesses to a shared hardware resource.

FIG. 8 is a schematic diagram illustrating a particular example of an arrangement/mechanism for controlling execution of a process based on a usage bound of the number of allowable accesses to a shared hardware resource. In this particular example, an OS scheduler controls the execution of processes in the following way. The OS scheduler sets or programs an initial value for a particular process A into the PMU counter, residing in the PMU. This programmed initial value can be calculated by subtracting the usage bound of process A from the maximum possible value of the PMU counter, as previously explained. The OS scheduler context switches and starts the execution of process A. There are several shared resource accesses while running process A. Accesses to the shared resource is detected by the PMU, incrementing the corresponding PMU counter. When the PMU counter reaches its maximum value and there is a counter overflow, an interrupt is generated. The OS scheduler handles the interrupt by swapping out process A and restarting the mechanism for process B. The OS scheduler thus sets an initial value for process B into the PMU counter by subtracting the usage bound of process B from the maximum possible value of the PMU counter. The OS scheduler then context switches and starts the execution of process B. When the PMU counter reaches its maximum value and there is a counter overflow, an interrupt is generated, and the OS scheduler handles this interrupt accordingly.

The proposed mechanism illustrated in the example of FIG. 8 thus relies on hardware support for monitoring resource usage. Fortunately, there are many types of hardware PMUs available in modern CPUs. The inventors have realized that such PMUs can be used to support the shared-resource scheduling described herein. In a way, part of the proposed mechanism is to set or configure selected hardware PMUs to generate an interrupt when a limited bound on the usage of a particular hardware resource for a particular process has been reached.

The proposed mechanism is applicable to most hardware processing platforms. Thus better resource sharing between applications can be introduced in many industrial systems without the need to invest in new, more powerful and costly hardware. There is also generally no need for application software changes. The proposed mechanism further offers the possibility to co-locate several processes/applications/ virtual machines on the same hardware and still ensure satisfactory performance and QoS.

EXAMPLE—VIRTUALIZATION

It is becoming increasingly popular to provide computing services (hardware and/or software) in devices such as servers and/or network nodes where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
 Consolidation of functionality into virtualized software running on customized or generic hardware. This is sometimes referred to as network function virtualization.
 Co-location of one or more application stacks, including operating system, running on separate hardware onto a single hardware platform. This is sometimes referred to as system virtualization, or platform virtualization.
 Co-location of hardware and/or software resources with the objective of using some advanced domain level scheduling and coordination technique to gain increased system resource utilization. This is sometimes referred to as resource virtualization, or centralized and coordinated resource pooling.

By way of example, during operation, the processor(s) may execute software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

Figures 15A, 15B:
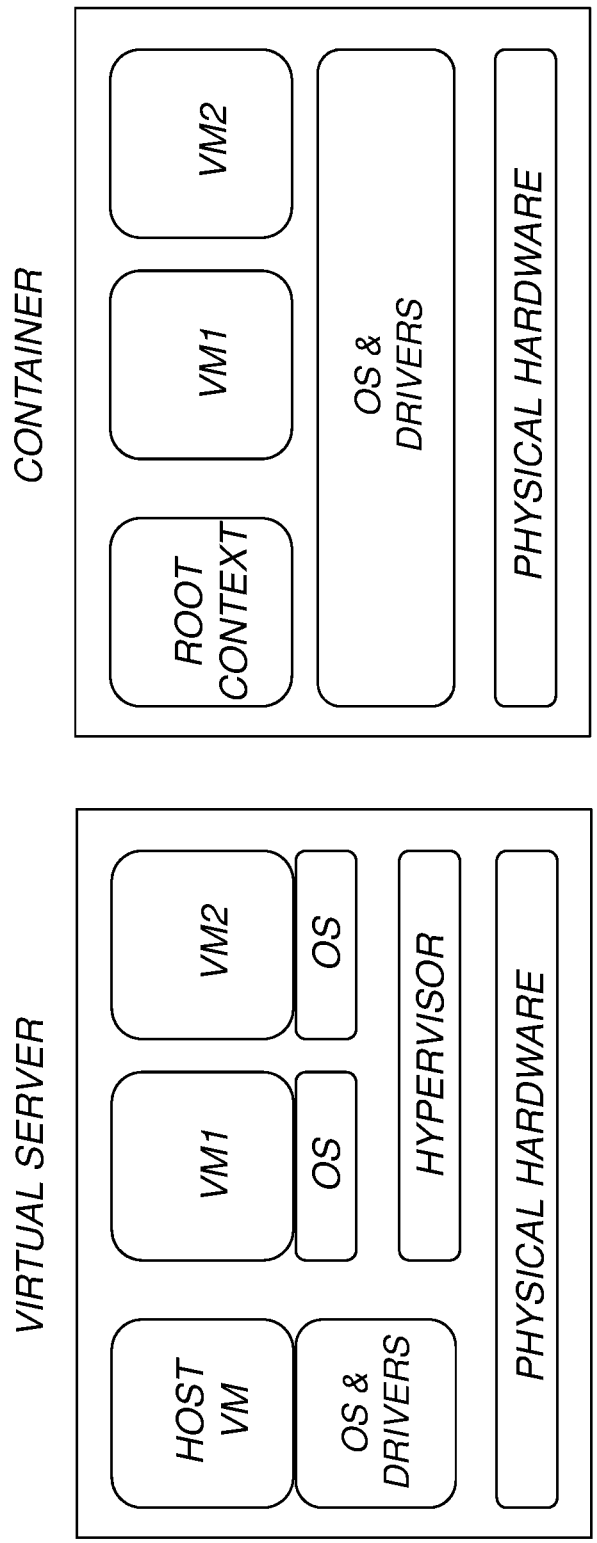
FIG. 15A is a schematic diagram illustrating an example of a Virtual Server implementing a number of Virtual Machines.
FIG. 15B is a schematic diagram illustrating an example of a Container solution implementing a number of Virtual Machines in a more light-weight form of virtualization.

FIG. 15A is a schematic diagram illustrating an example of a Virtual Server implementing a number of Virtual Machines. In a Virtual Server there is normally a hypervisor isolating the VMs such as VM1 and VM 2 from each other.

FIG. 15B is a schematic diagram illustrating an example of a Container solution implementing a number of Virtual Machines in a more light-weight form of virtualization. In a container, there is usually no need for a hypervisor layer. Instead, the OS is shared by the VMs.

It should also be understood that any of the techniques for virtualization may be recursively nested, if desired. By way of example, it is possible to run a VM inside another VM, which in turn runs inside yet another VM, and so on. Another example involves running a container inside a VM, or the other way around. The processes to be considered for scheduling by the process scheduler may be executed on any of these VMs and/or containers on one or more of the recursive levels.

It is also possible to envisage scenarios where a programming language involves a number of processes that are scheduled with respect to shared hardware resources. For example, a processing system may execute a VM running an OS, and the OS may be handling a process, which runs a programming language that involves some form of scheduling of threads and/or programming language processes. A wide variety of different scenarios that involve different levels and/or forms of virtualization can also be envisaged.

By way of example, for telecom and/or network applications, so called Virtual Network Element(s) (VNEs) may be implemented and used to perform network functionality. This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

The proposed mechanism may be used for any type of shared hardware resource, especially where there are suitable hardware counters available. In the following, however, the proposed mechanism will be exemplified in the non-limiting context of caches and other types of shared memories.

EXAMPLE—USE CASE 1

Figure 9:
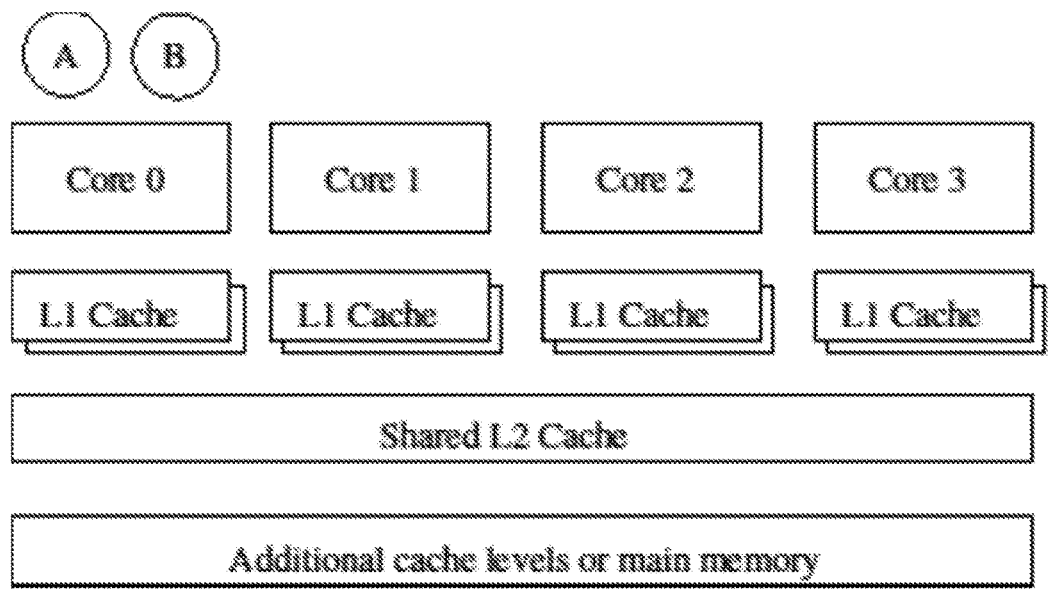
FIG. 9 is a schematic diagram illustrating an example of a processing system in which two processes A and B execute on the same processor core and share at least one level of cache memory, including level 1 cache.

FIG. 9 is a schematic diagram illustrating an example of a processing system in which two processes A and B execute on the same processor core and share at least one level of cache memory, including level 1 cache.

In this example, two processes A, B competes for the same shared L1 cache because they run on the same CPU core, see FIG. 9. When process A executes, process A sometimes makes a large amount of L1 cache accesses resulting in a high chance that process B's memory blocks get evicted from the L1 cache. Cache eviction will in turn cause process B, when allowed to execute, to spend a lot of its execution time to once again populate the L1 cache.

Using the proposed mechanism it is possible to bound the amount of L1 accesses that process A is allowed to perform.

Figure 10:
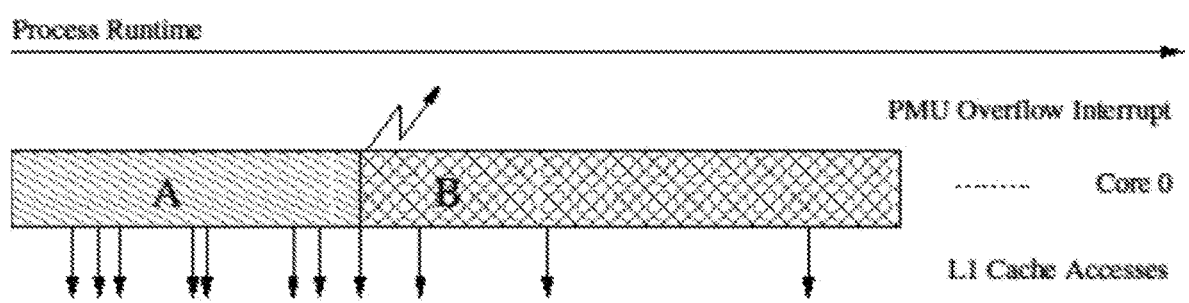
FIG. 10 is a schematic diagram illustrating an example of process execution corresponding to FIG. 9, where two processes A and B are scheduled for execution on the same processor core, including generating a Performance Monitor Unit (PMU) overflow interrupt when the access bound for process A has been reached, allowing the process scheduler to stall process A and start execution of process B.

FIG. 10 is a schematic diagram illustrating an example of process execution corresponding to FIG. 9, where two processes A and B are scheduled for execution on the same processor core, including generating a PMU overflow interrupt when the access bound for process A has been reached, allowing the process scheduler to stall process A and start execution of process B.

When process A has depleted its L1 access quota, see FIG. 10 for an illustration, a PMU overflow interrupt is generated. This allows the process scheduler to stall process A and instead let process B initiate or resume execution. Since most of process B's memory blocks still remain in the cache, process B now has to spend much less time on fetching memory.

This is different from traditional CPU-quota scheduling which would only consider the amount of CPU time that A has been using.

EXAMPLE—USE CASE 2

Figure 11:
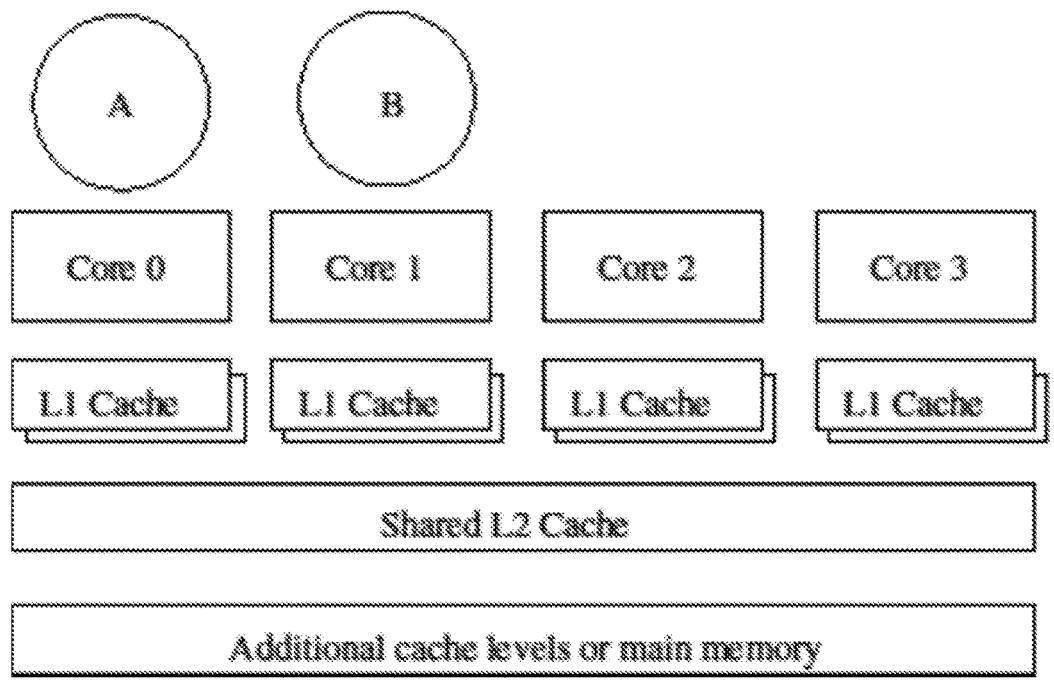
FIG. 11 is a schematic diagram illustrating an example of a processing system in which two processes A and B execute on different processor cores and share at least one level of cache memory, including level 2 cache.

FIG. 11 is a schematic diagram illustrating an example of a processing system in which two processes A and B execute on different processor cores and share at least one level of cache memory, including level 2 cache.

This second use case illustrates a hardware processing architecture with a similar layout as the first use case. However, contrary to the first use case, processes A and B are scheduled to be executed in parallel on two different processor cores. In the example of FIG. 11, processes A and B share the L2 cache. When process A use a lot of memory there is a large risk that process B's execution behavior will be affected, often in a unpredictable way, through memory contention in the L2 cache. For example, process A's execution may lead to a situation in which memory blocks needed by process B gets evicted from the L2 cache.

Figure 12:
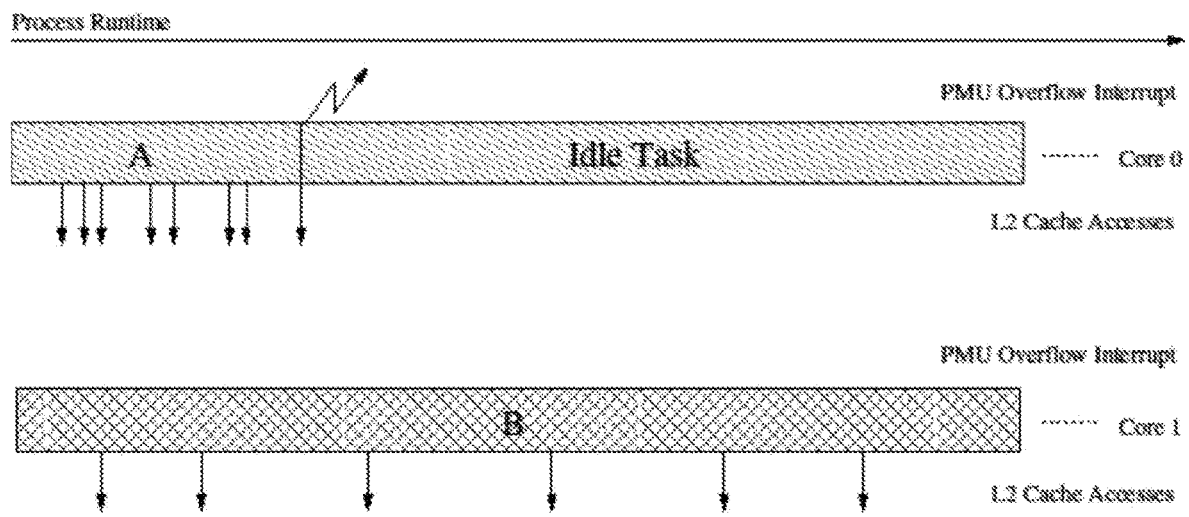
FIG. 12 is a schematic diagram illustrating an example of process execution corresponding to FIG. 11, where two processes A and B are executed in parallel on different cores, including generating a PMU overflow interrupt when the access bound for process A has been reached, allowing the process scheduler to stall process A on its processor core and enable process B to execute in isolation on its processor core.

FIG. 12 is a schematic diagram illustrating an example of process execution corresponding to FIG. 11, where two processes A and B are executed in parallel on different cores, including generating a PMU overflow interrupt when the access bound for process A has been reached, allowing the process scheduler to stall process A on its processor core and enable process B to execute in isolation on its processor core. Using the proposed mechanism the processes scheduler can thus provide a bound on process A's L2 cache accesses. When process A's L2 cache quota is depleted, the process scheduler can stall A's execution. This allows process B to execute without risking getting its memory suddenly evicted from the L2 cache. The scenario is illustrated in FIG. 12.

EXAMPLE—USE CASE 3

Figure 13:
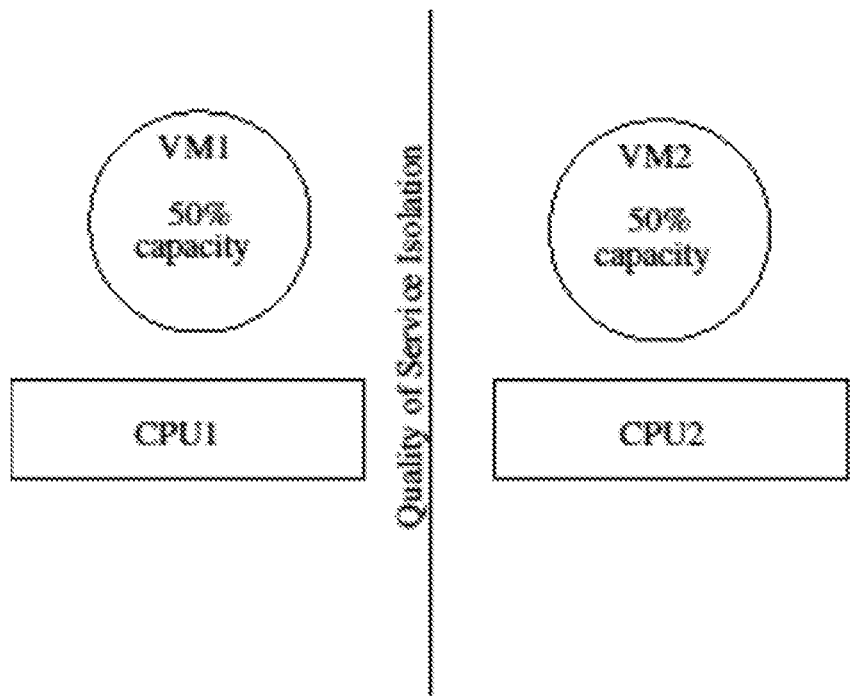
FIG. 13 is a schematic diagram illustrating an example of situation in which each of a number of Virtual Machines is allocated to a dedicated CPU.

FIG. 13 is a schematic diagram illustrating an example of situation in which each of a number of Virtual Machines is allocated to a dedicated CPU.

The mechanism can also be used for facilitating shared-resource scheduling within a cloud platform. Hardware overprovisioning is today used in many cloud platforms as a mean to enforce QoS. One reason for overprovisioning is that current process schedulers cannot bind shared hardware resource usage for Virtual Machines and their guest applications. FIG. 13 illustrates a commonly used solution as of today. QoS is guaranteed by pinning each virtual machine to a dedicated CPU. Unfortunately, each VM only utilizes a fraction of the total capacity of its CPU.

Figure 14:
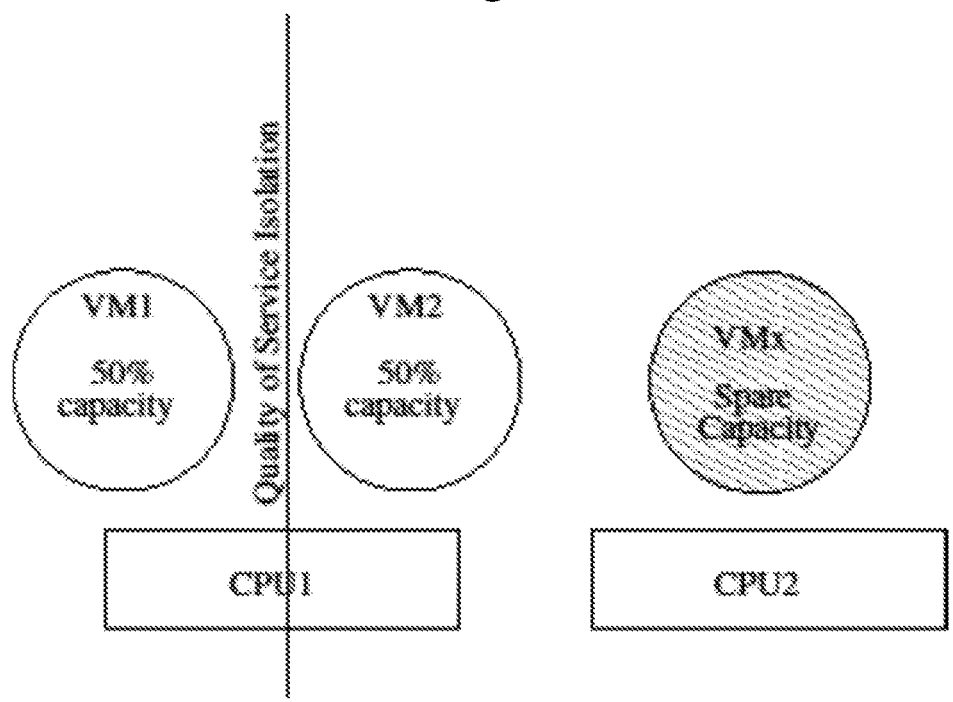
FIG. 14 is a schematic diagram illustrating an example of a situation in which a process scheduler enforces QoS and allows Virtual Machines to be allocated to the same CPU.

FIG. 14 is a schematic diagram illustrating an example of a situation in which a process scheduler enforces QoS and allows Virtual Machines to be allocated to the same CPU.

Guaranteeing QoS while co-locating VMs on the same CPU is only possible when having good control over how VMs access shared HW resources. The proposed mechanism provides a foundation for constructing process schedulers that can take shared resource usage of Virtual Machines into account. FIG. 14 illustrates how shared resource scheduling as outlined herein makes it possible to co-locate VM1 and VM2 on the same CPU, still guaranteeing QoS.

In general, the possibility to co-locate QoS demanding VMs should allow for better utilization of available hardware resources in cloud environments, thus providing an opportunity for cost savings.

EXAMPLE—COMPUTER IMPLEMENTATION

Figure 16:
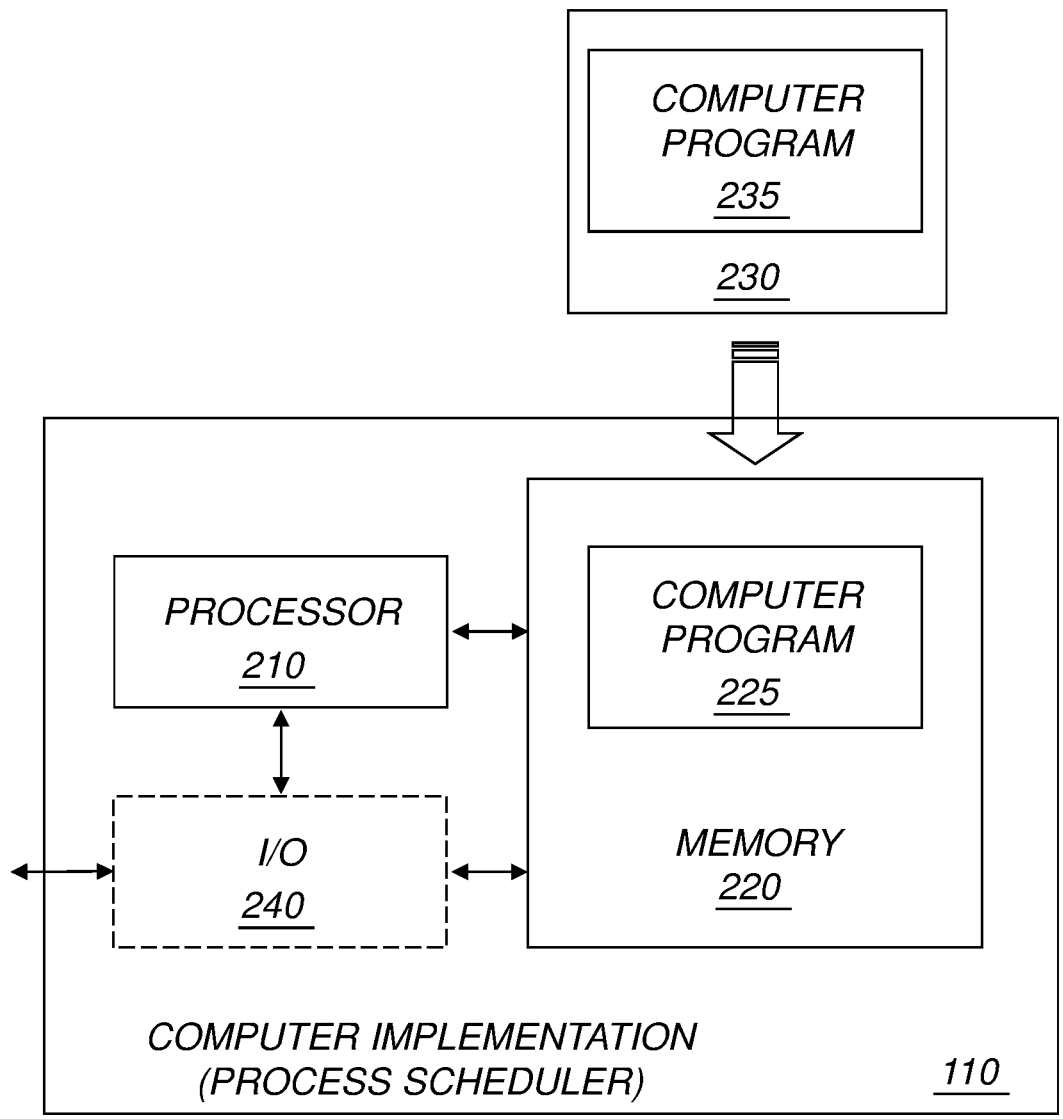
FIG. 16 is a schematic diagram illustrating an example of a computer implementation suitable for a process scheduler.

FIG. 16 is a schematic diagram illustrating an example of a computer implementation suitable for a process scheduler. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, there is provided a computer program 225; 235 for enabling, when executed, scheduling of processes in a processing system having at least one processor and associated hardware resources, at least one of the hardware resources being shared by at least two of the processes. The computer program 225; 235 comprises instructions, which when executed by at least one processor 210, cause the at least one processor 210 to control execution of a process based on a usage bound of the number of allowable accesses, by the process, to a shared hardware resource by halting execution of the process when the number of allowable accesses has been reached, and enabling idle mode or start of execution of a next process.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
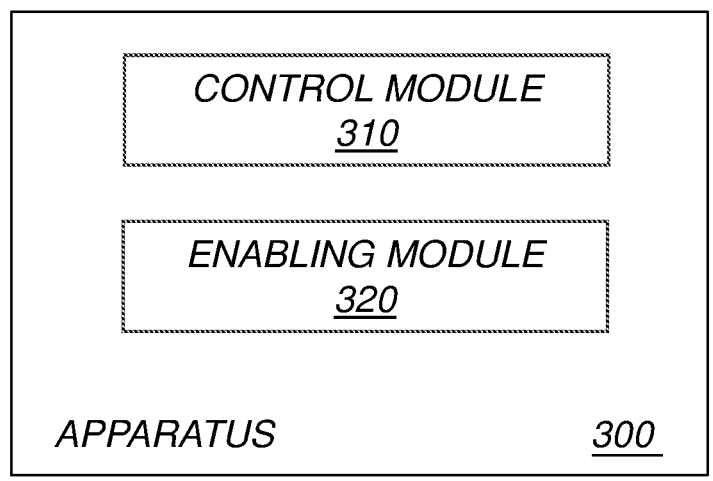
FIG. 17 is a schematic diagram illustrating an example of an apparatus for enabling process scheduling in a processing system.

FIG. 17 is a schematic diagram illustrating an example of an apparatus for enabling process scheduling in a processing system having at least one processor and associated hardware resources, wherein at least one of the hardware resources is shared by at least two processes. The apparatus 300 comprises:

- a control module 310 for controlling execution of a process based on a usage bound of the number of allowable accesses, by the process, to a shared hardware resource by halting execution of the process when the number of allowable accesses has been reached; and
- an enabling module 320 for enabling idle mode or start of execution of a next process.

Alternatively it is possible to realize the module(s) in FIG. 17 predominantly by hardware modules, or alternatively by hardware, with suitable interconnections between relevant modules. Particular examples include one or more suitably configured processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending data and/or signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] Inam, R., Mahmud, N., Behnam, M., Nolte, T., & Sjödin, M. (2014). The Multi-Resource Server for predictable execution on multi-core platforms. 2014 *IEEE 19th Real-Time and Embedded Technology and Applications Symposium (RTAS)*, 1-12. doi:10.1109/RTAS.2014.6925986.

[2] Inam, R., & Sjödin, M. (2014). Combating Unpredictability in Multicores through the Multi-Resource Server. In *Workshop on Virtualization for Real-Time Embedded Systems.* IEEE.

[3] Inam, R., Slatman, J., Behnam, M., Sjödin, M., & Nolte, T. (2013). Towards implementing multi-resource server on multi-core Linux platform. *Emerging Technologies & Factory Automation (ETFA)*, 2013 *IEEE 18th Conference on*, 1 (4), 10-13.

The invention claimed is:

1. A method for enabling scheduling of processes in a processing system having at least one processor and associated hardware resources, at least one of the hardware resources being shared by at least two of the processes, the method comprising:
    assigning a value, equal to or greater than two, of a usage bound of a number of allowable accesses, by a process, to a shared hardware resource, wherein the value of the usage bound is assigned before execution of the process or adapted during execution of the process;
    setting a counter to start count from an upper limit less the usage bound of the number of allowable accesses;
    monitoring the shared hardware resource by having the counter increment the count for each access to the shared hardware resource by the process, wherein a performance monitor unit monitors each access to the shared hardware resource;
    generating an interrupt when the count exceeds the upper limit;
    controlling execution of the process based on the usage bound of the number of allowable accesses, by the process, to the shared hardware resource by halting execution of the process based on the interrupt; and
    enabling an idle mode or start of execution of a next process, in response to halting execution of the process.

2. The method of claim 1, wherein the controlling execution of the process is repeated for a next process.

3. The method of claim 1, wherein an individual usage bound, with a value equal to or greater than two, is assigned to each of a number of processes for each of a number of shared hardware resources.

4. The method of claim 1, wherein the usage bound, $\text{USAGE\_BOUND}_{P,R}$, for process P and shared hardware resource R, is assigned and a start value of the counter, $\text{PMU}_R$, for shared hardware resource R is set, before scheduling the process P for execution, to the following value:

$$\text{PMU}_R = \text{MAX\_VAL\_PMU}_R - \text{USAGE\_BOUND}_{P,R}$$

where $\text{MAX\_VAL\_PMU}_R$ is a maximum value of the counter set as the upper limit, and
wherein the $\text{PMU}_R$ for the shared hardware resource R is incremented by one for each access to the shared hardware resource R, and when the counter has reached its maximum value $\text{MAX\_VAL\_PMU}_R$, a next increment generates the interrupt.

5. The method of claim 1, wherein the processes are originating from one or more applications.

6. The method of claim 5, wherein the one or more applications are running inside Virtual Machines (VM) or containers.

7. The method of claim 1, wherein the shared hardware resource includes at least one of the following:
   a memory, cache, or memory and cache resource;
   a processor pipeline resource;
   an execution branch resource;
   a Translation Lookaside Buffer (TLB) resource;
   a Floating Point (FP) operation/instruction resource;
   a processing interrupt resource;
   a Single Instruction Multiple Data (SIMD) vector instruction resource; and
   a Multiple Instruction Multiple Data (MIMD) vector instruction resource.

8. The method of claim 1, wherein the number of allowable accesses to the shared hardware resource includes at least one of the following:
   memory, cache, or memory and cache miss rate or ratio;
   instructions completed;
   pipeline stall rate or ratio;
   pipeline instruction throughput rate or ratio;
   branch miss rate or ratio;
   fetched or completed instruction rate or ratio;
   Translation Lookaside Buffer (TLB) miss rate or ratio;
   Floating Point (FP) operation rate or ratio;
   interrupt rate or ratio;
   Single Instruction Multiple Data (SIMD) vector instruction rate or ratio; and
   Multiple Instruction Multiple Data (MIMD) vector instruction rate or ratio.

9. The method of claim 1, wherein the shared hardware resource is a memory, cache, or memory and cache resource and the number of allowable accesses is represented by a number of allowable memory, cache, or memory and cache accesses.

10. An apparatus configured to enable scheduling of processes in a processing system having at least one processor and associated hardware resources, at least one of the hardware resources being shared by at least two of the processes, the apparatus comprising:
   a processing circuitry; and
   a memory containing a computer program which, when executed by the processing circuitry, causes the apparatus to:
      assign a value, equal to or greater than two, of a usage bound of a number of allowable accesses, by a process, to a shared hardware resource, wherein the value of the usage bound is to be assigned before execution of the process or adapted during execution of the process;
      set a counter to start count from an upper limit less the usage bound of the number of allowable accesses;
      monitor the shared hardware resource, by use of a performance monitor unit, to have the counter increment the count for each access to the shared hardware resource by the process, and to generate an interrupt when the count exceeds the upper limit;
      control execution of the process based on the usage bound of the number of allowable accesses, by the process, to the shared hardware resource by halting execution of the process in response to the interrupt; and
      enable an idle mode or start of execution of a next process, in response to halting execution of the process.

11. The apparatus of claim 10, wherein the apparatus is configured to control execution of processes originating from one or more applications.

12. The apparatus of claim 11, wherein the one or more applications are running inside Virtual Machines (VM) or containers.

13. The apparatus of claim 10, wherein the apparatus is configured to operate with a shared hardware resource that includes at least one of the following:
   a memory, cache, or memory and cache resource;
   a processor pipeline resource;
   an execution branch resource;
   a Translation Lookaside Buffer (TLB) resource;
   a Floating Point (FP) operation/instruction resource;
   a processing interrupt resource;
   a Single Instruction Multiple Data (SIMD) vector instruction resource; and
   a Multiple Instruction Multiple Data (MIMD) vector instruction resource.

14. The apparatus of claim 10, wherein the apparatus is configured to operate with the number of allowable accesses to the shared hardware resource includes at least one of the following:
   memory, cache, or memory and cache miss rate or ratio;
   instructions completed;
   pipeline stall rate or ratio;
   pipeline instruction throughput rate or ratio;
   branch miss rate or ratio;
   fetched or completed instruction rate or ratio;
   Translation Lookaside Buffer (TLB) miss rate or ratio;
   Floating Point (FP) operation rate or ratio;
   interrupt rate or ratio;
   Single Instruction Multiple Data (SIMD) vector instruction rate or ratio; and
   Multiple Instruction Multiple Data (MIMD) vector instruction rate or ratio.

15. The apparatus of claim 10, wherein the apparatus is configured to operate with the shared hardware resource that is a memory, cache, or memory and cache resource and the number of allowable accesses being represented by a number of allowable memory, cache, or memory and cache accesses.

16. The apparatus of claim 10, wherein the apparatus is configured with a process scheduler and a number of one or more counters, one for each shared hardware resource to count the number of accesses to that shared hardware resource.

17. The apparatus of claim 16, wherein the process scheduler is an Operating System (OS) scheduler.

18. The apparatus of claim 10, wherein the apparatus is also configured to control execution of the next process based on the usage bound of the number of allowable accesses to the shared hardware resource, wherein the usage bound is individual for each process.

19. A process scheduler configured to control execution of processes in a processing system having at least one processor and associated hardware resources, at least one of the hardware resources being shared by at least two of the processes, the process scheduler comprising:
- a processing circuitry; and
- a memory containing a computer program which, when executed by the processing circuitry, causes the process scheduler to:
  - assign a value, equal to or greater than two, of a usage bound of a number of allowable accesses, by a process, to a shared hardware resource, wherein the value of the usage bound is to be assigned before execution of the process or adapted during execution of the process;
  - cooperate with a counter configured to start count from an upper limit less the usage bound of the number of allowable accesses to the shared hardware resource by the process;
  - cooperate with a performance monitor configured to monitor each access to the shared hardware resource and to have the counter increment the count for each access to generate an interrupt when the count exceeds the upper limit;
  - receive the interrupt from the counter;
  - control execution of the process based on the usage bound of the number of allowable accesses, by the process, to the shared hardware resource by halting execution of the process in response to the interrupt; and
  - enable an idle mode or start of execution of a next process, in response to halting execution of the process.

* * * * *